(12) United States Patent
Hosseinifar et al.

(10) Patent No.: US 10,365,135 B2
(45) Date of Patent: Jul. 30, 2019

(54) FLEXIBLE MAGNETIC-BASED FLOW METER AND METHOD FOR MAKING A FLEXIBLE FLOW METER

(71) Applicants: Abdurahman Hosseinifar, Isfahan (IR); Mojtaba Shariati-Niasar, Tehran (IR); Seyyed-Ali Seyyed-Ebrahimin, Tehran (IR)

(72) Inventors: Abdurahman Hosseinifar, Isfahan (IR); Mojtaba Shariati-Niasar, Tehran (IR); Seyyed-Ali Seyyed-Ebrahimin, Tehran (IR)

( * ) Notice: Subject to any disclaimer, the term of this patent is extended or adjusted under 35 U.S.C. 154(b) by 60 days.

(21) Appl. No.: 15/865,211

(22) Filed: Jan. 8, 2018

(65) Prior Publication Data

US 2019/0033105 A1 Jan. 31, 2019

(51) Int. Cl.
| | | |
|---|---|---|
| *G01F 1/60* | (2006.01) | |
| *G01F 1/20* | (2006.01) | |
| *G01F 1/58* | (2006.01) | |
| *G01F 25/00* | (2006.01) | |
| *G01F 15/00* | (2006.01) | |

(52) U.S. Cl.
CPC ............. *G01F 1/60* (2013.01); *G01F 1/20* (2013.01); *G01F 1/582* (2013.01); *G01F 15/006* (2013.01); *G01F 25/0007* (2013.01)

(58) Field of Classification Search
CPC ...................... G01F 1/60; G01F 1/20
See application file for complete search history.

(56) References Cited

U.S. PATENT DOCUMENTS

| | | | | |
|---|---|---|---|---|
| 9,456,955 | B2 * | 10/2016 | Lanigan | A61J 1/20 |
| 9,664,550 | B2 * | 5/2017 | Cole | G01F 15/14 |
| 2018/0003532 | A1 * | 1/2018 | Vanberg | F24D 19/10 |

* cited by examiner

*Primary Examiner* — Jewel V Dowtin (57) ABSTRACT

A flexible magnetic assembly based flow rate measurement device or flow meter, and method of sensing flow rate of a fluid using a flow rate measurement device are disclosed. The device comprises three separable chambers such as, a basal chamber, a mid-chamber and a top chamber. The basal chamber with an inlet and an outlet, is incorporated with a main sensitive component i.e. flexible magnetic assembly along flow path of a fluid that enter from the inlet and exit from the outlet of the basal chamber. The mid-chamber comprises a magnetic sensor, placed over the flexible magnetic assembly is configured to sense the changes in magnetization value. The top chamber comprises a processor and a display unit, is configured to process, convert and display the magnetization value. Further, a method of fabricating flexible magnetic assembly for a flow rate measurement device is also disclosed.

12 Claims, 11 Drawing Sheets

FLEXIBLE MAGNETIC-BASED FLOW METER AND METHOD FOR MAKING A FLEXIBLE FLOW METER

BACKGROUND OF THE INVENTION

Generally, a flow meter is a device used to measure the flow rate or quantity of a gas or liquid moving through a pipe. Flow measurement applications are very diverse and each situation has its own constraints and engineering requirements. Flow meters are referred to by many names, such as flow gauge, flow indicator, liquid meter, etc. depending on the particular industry. However the function of the flow meter, to measure flow, remains the same.

Precision flow meters are used to provide accurate monitoring and/or flow control. Some industrial applications require precise calculation of quantity, such as precision servo-valve development for the aerospace industry. On the other hand, an application to measure water flow to a vineyard may only require a measurement accuracy of 5% to 10%.

There exists various types of flow meters based on different parameters, such as positive displacement, mass, and velocity. Positive displacement (PD) flow meters are unique as they are the only meter to directly measure the actual volume. All other types infer the flow rate by making some other type of measurement and equating it to the flow rate. With PD meters, the output signal is directly related to the volume passing through the meter. Includes bi-rotor types such as gear, oval gear, helical gear, disc, reciprocating piston, and oscillating or rotary piston.

In mass based flow meter, the output signal is directly related to the mass passing through the meter. Thermal and Coriolis flow meters fall into this category. In velocity based flow meter, the output signal is directly related to the velocity passing through the meter.

A common flow meter like a differential pressure and positive displacement flow meters is the magnetic flow meter, also technically an electromagnetic flow meter or more commonly called as mag meter. A magnetic field is applied to the metering tube, which results in a potential difference proportional to the flow velocity perpendicular to the flux lines. The physical principle at work is based on electromagnetic induction. The magnetic flow meter requires a conducting fluid, for example, water that contains ions, and an electrical insulating pipe surface. The magnetic flow meters is performed based on induction of conductive fluids resulting from passage through a coil. The induced electrical current in the coil is a measure of flow rate. So, these types of flow meter works only on conductive fluids.

Currently, a novel method for flow rate measurement are based on actuation of sensitive components that are directly in contact with the fluid. Physical or chemical characteristics of these component alter via the fluid parameters such as velocity, temperature, etc. currently some kind of hierarchical structures obtained from lithography and replica molding methods are being used as sensitive components of measurement devices. The methods such as lithography, are usually time consuming and costly.

Thus, there exists a need for a simple and ergonomic flow meter that solves the problem of accounting low electrical conductivity of some fluids in flow rate measurement, as seen a limitation in the existing magnetic flow meters. Further, there is a need for a sensitive component fabricated by a field directed assembly of magnetic materials that could be used in the flow rate measurement. Application of such fabrication method of the sensitive component not only results in reduction of production costs, but also resolves some complex issues such as, template preparation in existing lithography and replica molding methods.

SUMMARY OF THE INVENTION

The present invention discloses a flexible magnetic assembly based flow meter or a flow rate measurement device. Moreover, the present invention also disclosed a method of fabricating main sensitive component for a flow rate measurement device and a method of sensing flow rate of a fluid using a flow rate measurement device.

In an embodiment, the flow rate measurement device or flow meter, comprises three separable chambers. Said three separable chambers include a basal chamber, a mid-chamber and a top chamber. The basal chamber with an inlet and an outlet, is incorporated with a main sensitive component along a flow path of a fluid that enter from the inlet and exit from the outlet of the basal chamber. The mid-chamber comprises a magnetic sensor, which is placed over the main sensitive component. The magnetic sensor is configured to sense the magnetization value from said main sensitive component. The top chamber comprises a processor and a display unit, is configured to process, convert and display the magnetization value to a user.

In one embodiment, the three separable chambers are connected to each other by screws, thereby the chambers are sealed completely. The chambers are made of polymeric or non-magnetic metallic materials. In one embodiment, the main sensitive component is a flexible magnetic assembly. In some embodiments, the flexible magnetic assembly is a brush-like polymer matrix embedded with magnetic particles. In one embodiment, the main sensitive component is fabricated by a field directed assembly method. In one embodiment, the flexible magnetic assembly is configured to deform by fluid force along the flow path of the fluid that enter from the inlet and exit from the outlet of the basal chamber. The deformation of the flexible magnetic assembly results in variation in net magnetic moment around the flexible magnetic assembly.

In one embodiment, the magnetic sensor placed over the flexible magnetic assembly senses the variation in the magnetic moment and convert into a digital value for display by the calibrated processor and display unit at the upper portion of the top chamber. In some embodiments, the device further comprises a power supply unit to power the processor and display unit. In one embodiment, the device further comprises an auxiliary magnet at the bottom portion of the basal chamber to promote magnetic field introduced to the magnetic sensor at the mid chamber.

In another embodiment, the method of fabricating main sensitive component for a flow rate measurement device is disclosed. In one embodiment, the method comprises the steps of: (1) using a magnetic field generating source, wherein the source comprises a steel body, a coil, a gap and a hot plate, (2) preparing a mixture of precursors comprising siloxane based polymers, magnetic nanoparticles, a hardener, and a solvent, (3) placing the mixture on the hot plate at predetermined temperature, (4) switching on the magnetic field generating source producing a brush-like flexible magnetic assembly, and (5) heating the flexible magnetic assembly at 100° C. to provide a main sensitive component in the flow meter.

In one embodiment, the method further comprises a step of evaporating the solvent by heating the mixture to produce the final flexible magnetic assembly. In some embodiments, the predetermined temperature for placing the mixture on the hot plate is 80° C. In one embodiment, the siloxane based polymer is polydimethylsiloxane (PDMS). In some embodiments, the magnetic nanoparticles are of any particle, but not limited to, iron, nickel, cobalt, and their alloys and compound, or their combination thereof. Further, the shape of the magnetic nanoparticle is of any shape including, but not limited to, spherical, rod, wire, or cubic. In one embodiment, the solvent is chloroform. In one embodiment, the saturation magnetization value of the iron based magnetic nanoparticles is about 74 emu/g.

In yet another embodiment, the method of sensing flow rate of a fluid using a flow rate measurement device is also disclosed. The method comprises the steps of: (1) introducing a fluid into an inlet of the flow rate measurement device incorporated with one or more flexible magnetic assemblies along the fluid path, (2) deforming the flexible magnetic assembly via fluidic force exerted over the fluid path, (3) determining the net magnetic moment around the flexible magnetic assembly upon deformation by a magnetic sensor placed over the flexible magnetic assembly, and (4) processing and displaying the magnetization value via a processor and a display unit at a top chamber of the flow rate measurement device.

One aspect of the present invention is directed to a flow rate measurement device, comprising three separable chambers including: (a) a basal chamber with an inlet and an outlet, incorporated with a main sensitive component along a flow path of a fluid that enter from the inlet and exit from the outlet of the basal chamber; (b) a mid-chamber comprises a magnetic sensor, placed over the main sensitive component configured to sense the magnetization value from said main sensitive component, and (c) a top chamber comprises a processor and a display unit, configured to process, convert and display the magnetization value.

In one embodiment, the three separable chambers are connected to each other by screws, thereby the chambers are sealed completely. In one embodiment, the chambers are made of polymeric or non-magnetic metallic materials. In one embodiment, the main sensitive component is a flexible magnetic assembly. In a related embodiment, the flexible magnetic assembly is a brush-like polymer matrix embedded with magnetic particles. In one embodiment, the main sensitive component is fabricated by a field directed assembly method. In a related embodiment, the flexible magnetic assembly is configured to deform by fluid force along the flow path of the fluid that enter from the inlet and exit from the outlet of the basal chamber. In another related embodiment, the deformation of the flexible magnetic assembly results in variation in net magnetic moment around the flexible magnetic assembly.

In one embodiment, the magnetic sensor placed over the flexible magnetic assembly senses the variation in the magnetic moment and convert into a digital value for display by the calibrated processor and display unit at the upper portion of the top chamber. In one embodiment, the device further comprises a power supply unit to power the processor and display unit. In one embodiment, the device further comprises an auxiliary magnet at the bottom portion of the basal chamber to promote magnetic field introduced to the magnetic sensor at the mid chamber.

Another aspect of the present disclosure is directed to a method of fabricating main sensitive component for a flow rate measurement device, comprising the steps of: (a) using a magnetic field generating source, wherein the source comprises a steel body, a coil, a gap and a hot plate, (b) preparing a mixture of precursors comprising siloxane based polymers, magnetic nanoparticles, a hardener, and a solvent; (c) placing the mixture on the hot plate at predetermined temperature; (d) switching on the magnetic field generating source producing a brush-like flexible magnetic assembly, and (e) heating the flexible magnetic assembly at 100° C. to provide a main sensitive component in the flow meter.

In one embodiment, the method further comprises a step of evaporating the solvent by heating the mixture to produce the final flexible magnetic assembly. In a related embodiment of the method, the predetermined temperature for placing the mixture on the hot plate is 80° C. In another embodiment, the siloxane based polymer is polydimethylsiloxane (PDMS). In one embodiment, the magnetic nanoparticles are iron, nickel, cobalt, and their alloys and compound, or their combination thereof. In one embodiment, the shape of the nanoparticle is spherical, rod, wire, or cubic. In one embodiment, the solvent is chloroform. In one embodiment of the method, the saturation magnetization value of the iron based magnetic nanoparticles is about 74 emu/g.

One aspect of the present disclosure, a method of sensing flow rate of a fluid using a flow rate measurement device, comprising (a) introducing a fluid into an inlet of the flow rate measurement device incorporated with one or more flexible magnetic assemblies along the fluid path; (b) deforming the flexible magnetic assembly via fluidic force exerted over the fluid path; (c) determining the net magnetic moment around the flexible magnetic assembly upon deformation by a magnetic sensor placed over the flexible magnetic assembly, and (d) processing and displaying the magnetization value via a processor and a display unit at a top chamber of the flow rate measurement device.

Other objects, features and advantages of the present invention will become apparent from the following detailed description. It should be understood, however, that the detailed description and the specific examples, while indicating specific embodiments of the invention, are given by way of illustration only, since various changes and modifications within the spirit and scope of the invention will become apparent to those skilled in the art from this detailed description.

DETAILED DESCRIPTION

A description of embodiments of the present invention will now be given with reference to the figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

The present invention generally relates to a flow meter or a flow rate measurement device, and more particularly relates to a flexible magnetic assembly based flow meter.

The present invention discloses a flexible magnetic assembly based flow meter or a flow rate measurement device. Moreover, the present invention also disclosed a method of fabricating main sensitive component for a flow rate measurement device and a method of sensing flow rate based on actuation of the flexible magnetic assemblies incorporated in the flow rate measurement device.

Figure 1:
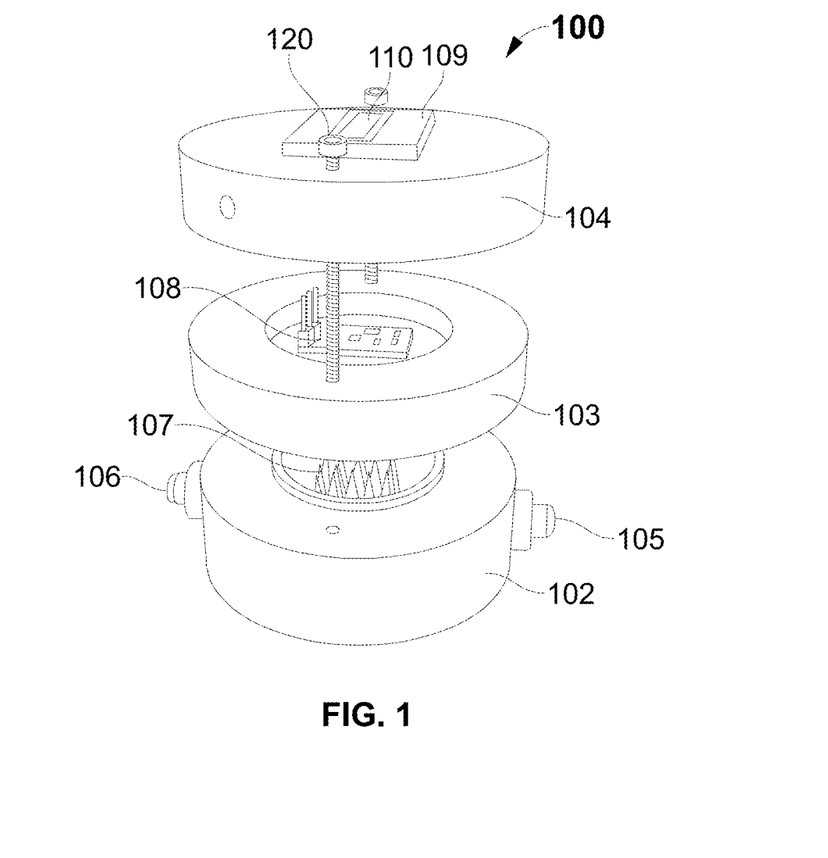
FIG. 1 exemplarily illustrates an exploded view of a flow rate measurement device, according to an embodiment of the present invention.
Figure 2:
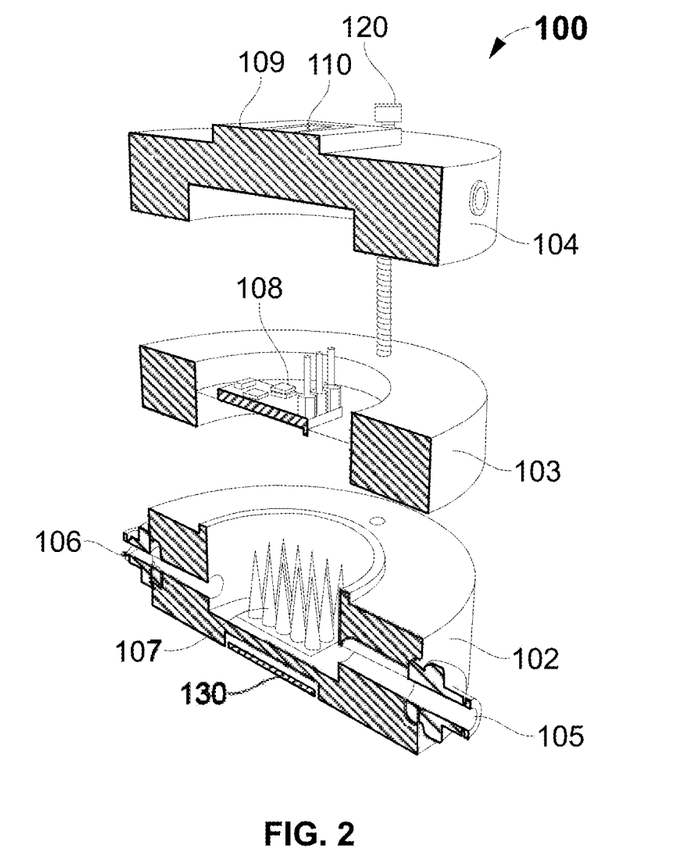
FIG. 2 exemplarily illustrates an exploded view of the sectioned flow rate measurement device of FIG. 1, according to an embodiment of the present invention.
Figure 3:
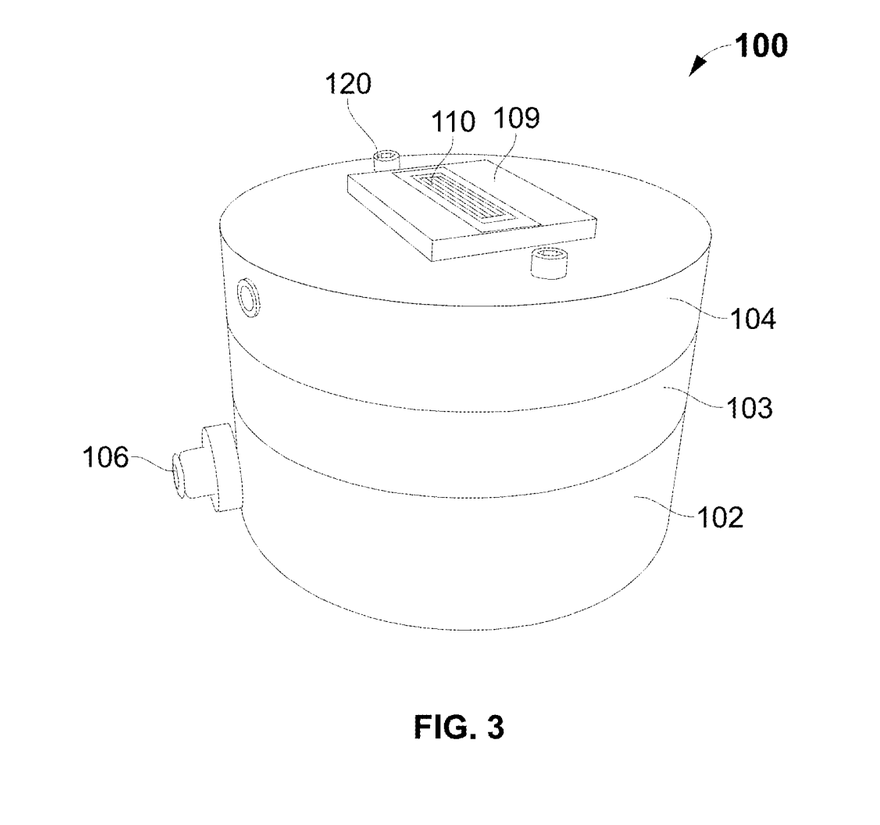
FIG. 3 exemplarily illustrates a top perspective view of the flow rate measurement device, according to an embodiment of the present invention.

Referring to FIG. 1-FIG. 3, the flow rate measurement device or flow meter 100, comprises three separable chambers (102, 103 and 104). Said three separable chambers include a basal chamber 102, a mid-chamber 103 and a top chamber 104. The basal chamber 102 with an inlet 105 and an outlet 106, is incorporated with a main sensitive component 107 along a flow path of a fluid that enter from the inlet 105 and exit from the outlet 106 of the basal chamber 102. The mid-chamber 103 comprises a magnetic sensor 108, which is placed over the main sensitive component 107 positioned inside the basal chamber 102. The magnetic sensor 108 is configured to sense the magnetization value from said main sensitive component 107. The top chamber 104 comprises a processor 109 and a display unit 110, is configured to process, convert and display the magnetization value to a user.

In one embodiment, the three separable chambers (102, 103 and 104) are connected to each other by screws 120, thereby the chambers are sealed completely. The chambers are made of polymeric or non-magnetic metallic materials. In one embodiment, the chamber is made of aluminum. In some embodiment, the inlet 105 and the outlet 106 are incorporated as, two tubing fitting with O-ring male straight connectors. In some embodiments, the device 100 further comprises a power supply unit to power the processor 109 and display unit 110. In one embodiment, 5 volts adaptor could be used as a power source, connected via a socket to the flow meter based on its application.

In one embodiment, the device 100 further comprises an auxiliary magnet 130 at the bottom portion of the basal chamber 104 to promote or enhance magnetic field around the magnetic field assembly. The implementation of the auxiliary magnet 130 further improves the sensitivity of the flow meter. In some embodiment, the auxiliary magnet 130 uses 50 G magnet at the bottom portion of the basal chamber, however, which may vary based on their end application.

One aspect of the present invention is directed to a flow rate measurement device. The device comprises three separable chambers including a basal chamber with an inlet and an outlet, incorporated with a main sensitive component along a flow path of a fluid that enter from the inlet and exit from the outlet of the basal chamber; a mid-chamber comprises a magnetic sensor, placed over the main sensitive component configured to sense the magnetization value from said main sensitive component; and a top chamber comprises a processor and a display unit, configured to process, convert and display the magnetization value.

The magnetic field of the auxiliary magnet 130 and the magnetic assembly are directed to the magnetic sensor 108. When a fluid passes through the flexible magnetic assembly, the fluidic force pushes the brush-like structure of the magnetic assembly. Therefore, net magnetic field around the flexible part of the magnetic assembly changes and a new magnetic field is introduced to the sensor 108. In some embodiments, three direction magnetic sensor with a sensibility to 5 milli-gauss could be used in the device 100. Before the fluid passes, the magnetic sensor 108 senses the maximum field resulting from the magnet 130 and main sensitive component 107 i.e. flexible magnetic assembly. When the fluid flows, the sensor 108 senses less magnetic field due to the disturbance in the field, due to fluid force on the flexible magnetic assembly.

Figure 4A:
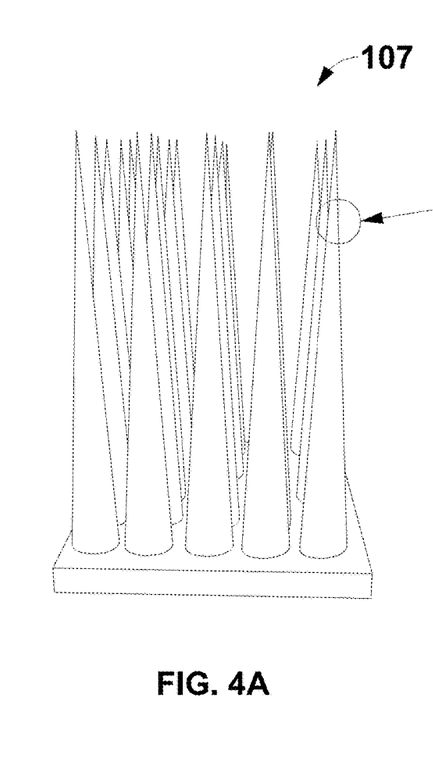
FIG. 4A exemplarily illustrates a front view of a main sensitive component utilized in the flow rate measurement device, according to an embodiment of the present invention.
Figure 4B:
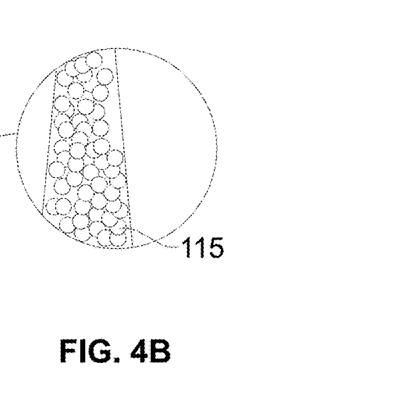
FIG. 4B exemplarily illustrates a zoom view of the main sensitive component embedded with magnetic particles shown in FIG. 4A, according to an embodiment of the present invention.

Further, referring to FIG. 4A, the main sensitive component 107 is a flexible magnetic assembly. In one embodiment, the main sensitive component 107 is fabricated by a field directed assembly method. In some embodiments, the flexible magnetic assembly is a brush-like polymer matrix embedded with magnetic particles 115. The brush-like polymer matrix comprises a plurality of magnetic particles 115 embedded inside the structure. The performance and activity of the assembly is comparable with the similar components fabricated by other existing methods, such as lithography and replica molding.

In one embodiment, the flexible magnetic assembly is configured to deform by fluid force along the flow path of the fluid that enter from the inlet 105 and exit from the outlet 106 of the basal chamber 102. The deformation of the flexible magnetic assembly results in variation in net magnetic moment around the flexible magnetic assembly. In one embodiment, the fluid entering into the basal chamber 102 deform the flexible magnetic assembly, via fluidic force, by bending it over the fluid path. As a result of deformation, net magnetic moment around said assembly changes, thereby the magnetic sensor 108 placed over the assembly senses the new magnetization value. In some embodiments, the magnetization value is converted into digit by the calibrated processor 109, and display via display unit 110 at the upper portion of the top chamber 104.

Figure 5:
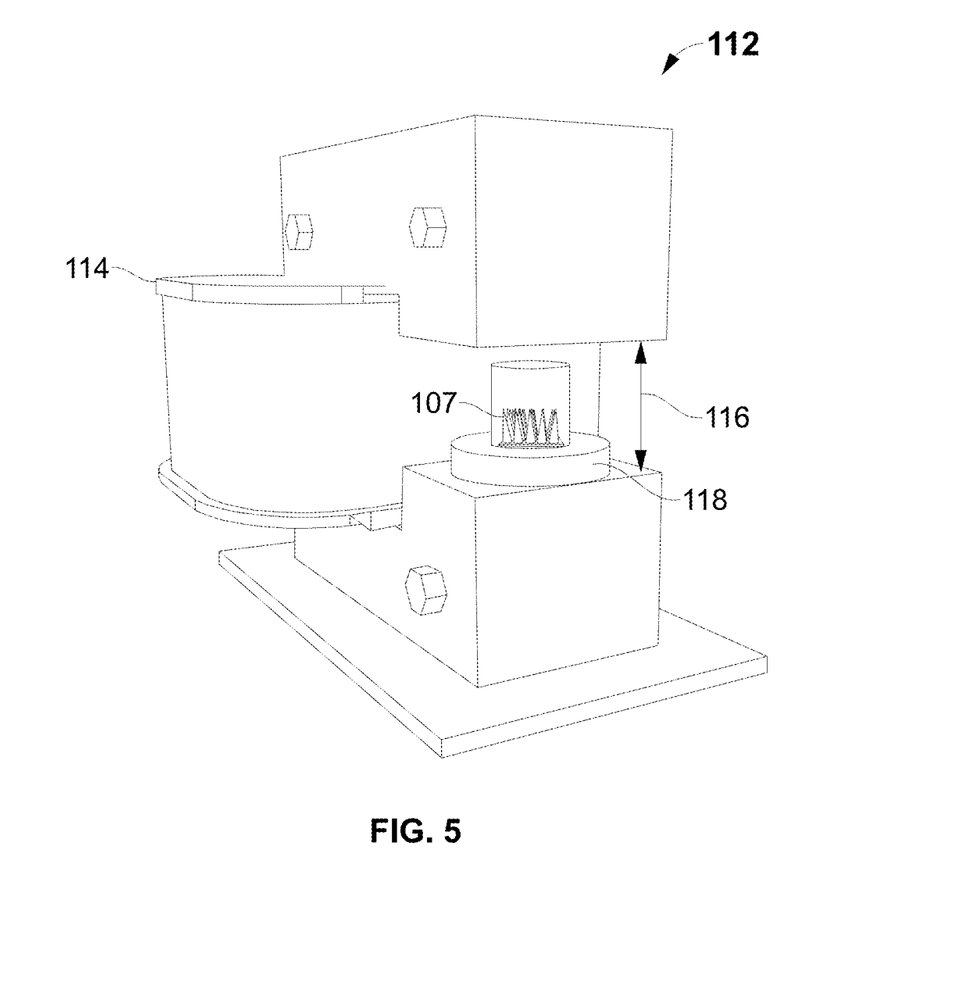
FIG. 5 exemplary illustrates a perspective view of the field directed assembly used for fabricating the main sensitive component, according to an embodiment of the present invention.
Figure 6:
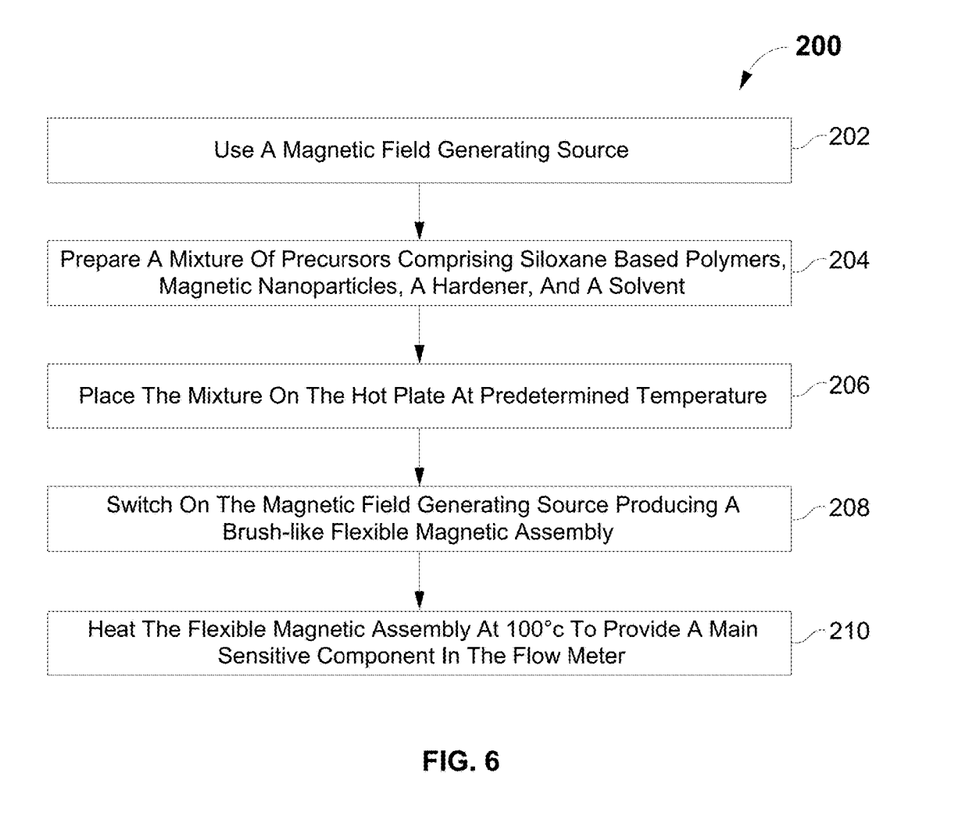
FIG. 6 exemplary illustrates a method of fabricating main sensitive component for a flow rate measurement device, according to another embodiment of the present invention.

Referring to FIG. 5 and FIG. 6, the method 200 of fabricating main sensitive component 107 for a flow rate measurement device 100 is disclosed. In one embodiment, the method 200 comprises the steps of, utilizing a magnetic field generating source 112, where the source 112 is made of steel body comprises a coil 114, a gap 116 and a hot plate 118 at step 202. At step 204, the method 200 include a step of, preparing a mixture of precursors comprising siloxane based polymers, magnetic nanoparticles, a hardener, and a solvent. The method 200 according to the present invention, at step 206, includes placing the mixture on the hot plate 118 at predetermined temperature. At step 208, switching on the magnetic field generating source 112 producing a brush-like flexible magnetic assembly. Finally, at step 210, the method 200 comprises, heating the flexible magnetic assembly at 100° C. to provide a main sensitive component 107 for the flow meter 100, as shown in FIG. 1-FIG. 3.

Figure 9:
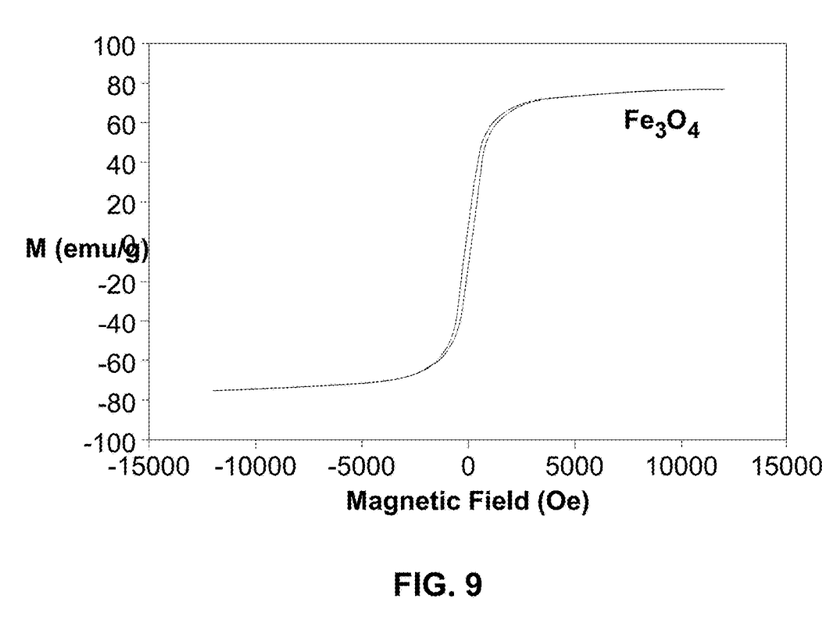
FIG. 9 graphically illustrates a ferromagnetic behavior of the $Fe_3O_4$ nanoparticles in the assembly.

In one embodiment, the method 200 further comprises a step of evaporating the solvent by heating the mixture to produce the final flexible magnetic assembly. In some embodiments, the predetermined temperature for placing the mixture on the hot plate 118 is 80° C. In one embodiment, the siloxane based polymer is polydimethylsiloxane (PDMS). Further, the siloxane based polymer matrix could be PDMS of any other grades. In some embodiments, the magnetic nanoparticles are of any particle, but not limited to, iron, nickel, cobalt, and their alloys and compound, or their combination thereof. One of the major factors related to the magnetic materials used in the fabrication of the assemblies is hysteresis behavior. Referring to FIG. 9, a hysteresis loop of $Fe_3O_4$ nanoparticles used in fabrication of magnetic assemblies. In one embodiment, the saturation magnetization value of the iron based magnetic nanoparticles is about 74 emu/g. Further, the shape of the magnetic nanoparticle is of any shape including, but not limited to, spherical, rod, wire, or cubic. In one embodiment, the solvent is chloroform.

Figure 7:
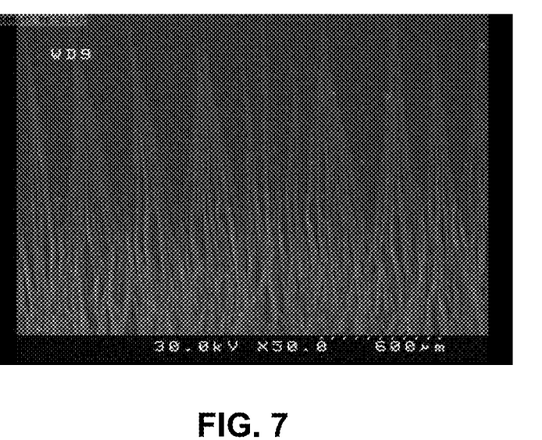
FIG. 7 illustrates a SEM image of a cross section of an exemplary flexible magnetic assembly.
Figure 8A:
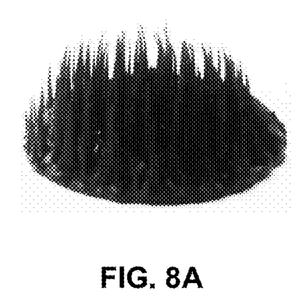
FIG. 8A-8C exemplary illustrates images of three different assemblies formed in different field conditions.
Figure 8B:
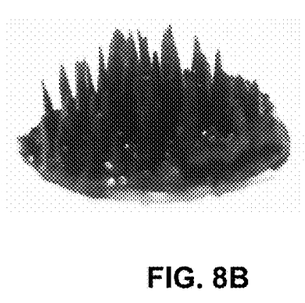
Figure 8C:
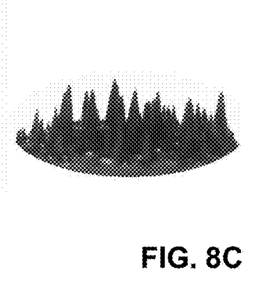

In one embodiment, a wide range of flexible magnetic assemblies can be produced using the external magnetic field source 112. Micrometer-length of assemblies could be formed in a field strength of 1 Tesla. FIG. 7, shows SEM micro-graph of cross section of an exemplary micrometer assembly. This assembly may be used as a main sensitive component 107 in the flow meter 100 for micro channels with a similar concept used in the present invention. FIG. 8A-8C exemplary illustrates images of three different assemblies formed in different field conditions.

Another aspect of the present disclosure is directed to a method of fabricating main sensitive component for a flow rate measurement device. The method comprises using a magnetic field generating source, wherein the source comprises a steel body, a coil, a gap and a hot plate; preparing a mixture of precursors comprising siloxane based polymers, magnetic nanoparticles, a hardener, and a solvent; placing the mixture on the hot plate at predetermined temperature; (d) switching on the magnetic field generating source producing a brush-like flexible magnetic assembly; (e) heating the flexible magnetic assembly at 100° C. to provide a main sensitive component in the flow meter.

Figure 10:
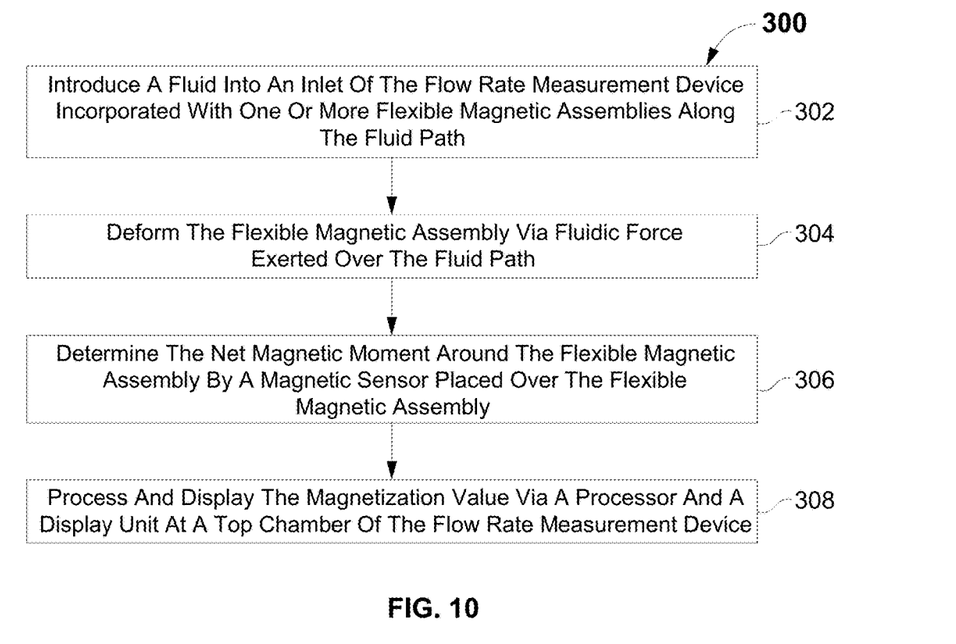
FIG. 10 exemplary illustrates a method of sensing flow rate of a fluid using a flow rate measurement device, according to another embodiment of the present invention.

Referring to FIG. 10, the method 300 of sensing flow rate of a fluid using a flow rate measurement device 100 as shown in FIG. 1-FIG. 3, is also disclosed. At step 302, the method 300 comprises the steps of, introducing a fluid into an inlet of the flow rate measurement device 100 incorporated with one or more flexible magnetic assemblies, which is a main sensitive component 107, along the fluid path. At step 304, the method 300 includes, deforming the flexible magnetic assembly via fluidic force exerted over the fluid path. At step 306, the method 300 further comprises, determining the net magnetic moment around the flexible magnetic assembly upon deformation by a magnetic sensor 108 placed over the flexible magnetic assembly. Finally, at step 308, the method 300 includes, processing and displaying the magnetization value via a processor 109 and a display unit 110 at an upper portion of the top chamber 104 of the flow rate measurement device 100.

Figure 11:
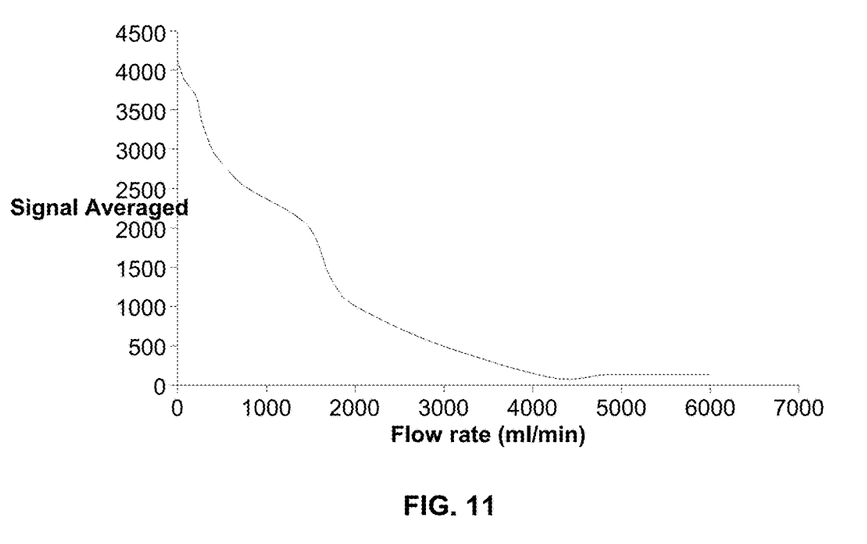
FIG. 11 graphically illustrates a representative calibration curve of flow meter obtained from different flow rates.

In one embodiment, the processor 109 could be a nano microprocessor and the display unit 110 could be a segmented four-digit display unit to show the signal. The processor 109 could be calibrated with known values comprising certain values of flow rate against obtained signal values. Referring to FIG. 11, a representative calibration curve of flow meter 100 obtained in different flow rates. From the graph, the obtained signal values are statistical average of obtained signals within 10 s, fluids flows inside the flow meter 100.

The flow rate measurement device 100 based on magnetic sensing has higher sensitivity comparing other measurement methods. The auxiliary magnet 130 at the bottom portion of the basal chamber 102 according to the present invention, promote magnetic field introduced to the sensor, which eliminate the application of expensive high sensitive sensors. By using the auxiliary magnet 130, the signal to noise ratio, which is a critical factor in performance of measurement devices, is enhanced.

Further, the field directed assembly method for fabricating sensitive component 107 for flow meter 100, when compared to other methods such as molding and lithography is dominated, because it is cost effective and results in accelerating the production time. On the other hand, parameters effect on the shape and morphology of the assembly are more controllable in the field directed method. For example, by altering the field intensity, or cilia density, number of needles of brush-like structure per unit of area is easily changed. Some other factors such as, magnetic component of the assembly are also important factors.

According to the present invention, the spherical magnetic particles generates anisotropy in the assembly instead of some common rod and wire shape particles in molding method. The concept of magnetic assembly based flowmeter 100 is introduced in this invention could be utilized in measurement of different fluid flow rates in microfluidics, as well as macro applications such as large pipes in gas and oil industries and so on.

One aspect of the present disclosure, a method of sensing flow rate of a fluid using a flow rate measurement device. The device comprises introducing a fluid into an inlet of the flow rate measurement device incorporated with one or more flexible magnetic assemblies along the fluid path; deforming the flexible magnetic assembly via fluidic force exerted over the fluid path; determining the net magnetic moment around the flexible magnetic assembly upon deformation by a magnetic sensor placed over the flexible magnetic assembly; and processing and displaying the magnetization value via a processor and a display unit at a top chamber of the flow rate measurement device.

The foregoing description comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method.

Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein. While the above is a complete description of the preferred embodiments of the invention, various alternatives, modifications, and equivalents may be used. Therefore, the above description and the examples should not be taken as limiting the scope of the invention, which is defined by the appended claims.

The invention claimed is:

1. A flow rate measurement device, comprising:
   three separable chambers including:
   a basal chamber with an inlet and an outlet, incorporated with a main sensitive component along a flow path of a fluid that enter from the inlet and exit from the outlet of the basal chamber;
   a mid-chamber comprises a magnetic sensor, placed over the main sensitive component configured to sense the magnetization value from said main sensitive component, and
   a top chamber comprises a processor and a display unit, configured to process, convert and display the magnetization value.

2. The device of claim 1, wherein the three separable chambers are connected to each other by screws, thereby the chambers are sealed completely.

3. The device of claim 1, wherein the chambers are made of polymeric or non-magnetic metallic materials.

4. The device of claim 1, wherein the main sensitive component is a flexible magnetic assembly.

5. The device of claim 4, wherein the flexible magnetic assembly is a brush-like polymer matrix embedded with magnetic particles.

6. The device of claim 1, wherein the main sensitive component is fabricated by a field directed assembly method.

7. The device of claim 4, wherein the flexible magnetic assembly is configured to deform by fluid force along the flow path of the fluid that enter from the inlet and exit from the outlet of the basal chamber.

8. The device of claim 7, wherein the deformation of the flexible magnetic assembly results in variation in net magnetic moment around the flexible magnetic assembly.

9. The device of claim 1, further comprising a power supply unit to power the processor and display unit.

10. The device of claim 1, wherein the magnetic sensor placed over the flexible magnetic assembly senses the variation in the magnetic moment and convert into a digital value for display by the calibrated processor and display unit at the upper portion of the top chamber.

11. The device of claim 1, further comprising an auxiliary magnet at the bottom portion of the basal chamber to promote magnetic field introduced to the magnetic sensor at the mid chamber.

12. A method of sensing flow rate of a fluid using a flow rate measurement device, comprising:
   introducing a fluid into an inlet of the flow rate measurement device incorporated with one or more flexible magnetic assemblies along the fluid path;
   deforming the flexible magnetic assembly via fluidic force exerted over the fluid path;
   determining the net magnetic moment around the flexible magnetic assembly upon deformation by a magnetic sensor placed over the flexible magnetic assembly, and
   processing and displaying the magnetization value via a processor and a display unit at a top chamber of the flow rate measurement device.

* * * * *

UNITED STATES PATENT AND TRADEMARK OFFICE
CERTIFICATE OF CORRECTION

PATENT NO. : 10,365,135 B2
APPLICATION NO. : 15/865211
DATED : July 30, 2019
INVENTOR(S) : Abdurahman Hosseinifar, Mojtaba Shariati-Niasar and Seyyed-Ali Seyyed-Ebrahimi It is certified that error appears in the above-identified patent and that said Letters Patent is hereby corrected as shown below:

On the Title Page

Item [72], delete "Seyyed-Ali Seyyed-Ebrahimin" and insert --Seyyed-Ali Seyyed-Ebrahimi--

Signed and Sealed this
Tenth Day of September, 2019

Andrei Iancu
*Director of the United States Patent and Trademark Office*